(12) United States Patent
Khomoutov et al.

(10) Patent No.: US 8,516,415 B1
(45) Date of Patent: Aug. 20, 2013

(54) METHOD AND SYSTEM FOR THE CONDENSED MACRO LIBRARY CREATION

(75) Inventors: Alexander F. Khomoutov, Kanata (CA); Brian J. Carlson, Ottawa (CA)

(73) Assignee: Cadence Design Systems, Inc., San Jose, CA (US)

( * ) Notice: Subject to any disclaimer, the term of this patent is extended or adjusted under 35 U.S.C. 154(b) by 676 days.

(21) Appl. No.: 12/650,923

(22) Filed: Dec. 31, 2009

Related U.S. Application Data

(62) Division of application No. 11/098,026, filed on Apr. 1, 2005, now Pat. No. 7,665,044.

(51) Int. Cl.
*G06F 17/50* (2006.01)

(52) U.S. Cl.
USPC .......................... 716/104; 716/106; 716/136

(58) Field of Classification Search
USPC .............. 716/101, 102, 103, 104, 106, 136
See application file for complete search history.

(56) References Cited

U.S. PATENT DOCUMENTS

| | | | |
|---|---|---|---|
| 6,895,569 B1 * | 5/2005 | Teig et al. | 716/129 |
| 6,907,589 B2 | 6/2005 | Frank | |
| 7,353,476 B2 | 4/2008 | Imada | |
| 2002/0010901 A1 * | 1/2002 | Otaguro | 716/12 |
| 2002/0140002 A1 * | 10/2002 | Suzuki et al. | 257/207 |
| 2006/0218516 A1 | 9/2006 | McLain | |
| 2009/0007050 A1 * | 1/2009 | Martin et al. | 716/16 |

OTHER PUBLICATIONS

Cadence Design Systems, Inc. "What's New in LEF/DEF" Product Version 5.5, Dec. 2002, updated Apr. 2004, Cadence Design Systems, Inc., San Jose, CA.
Cadence Design Systems, Inc. "LEF/DEF 5.5 Language Reference" Product Version 5.5, Apr. 2004, Cadence Design Systems, Inc., San Jose, CA.
Non-Final Office Action dated Aug. 27, 2008 for U.S. Appl. No. 11/098,026.
Non-Final Office Action dated Jul. 24, 2007 for U.S. Appl. No. 11/098,026.
Final Office Action dated Apr. 3, 2009 for U.S. Appl. No. 11/098,026.
Final Office Action dated Mar. 24, 2008 for U.S. Appl. No. 11/098,026.
Notice of Allowance dated Oct. 8, 2009 for U.S. Appl. No. 11/098,026.

* cited by examiner

*Primary Examiner* — Vuthe Siek
(74) *Attorney, Agent, or Firm* — Vista IP Law Group, LLP

(57) ABSTRACT

A method and a system to pre-scan a file, analyze data and create the Condensed Macro Library (CML) file. The method used is to find macros or cells of certain classes that are defined by rules. After a suitable macro or cell is identified, a parser scans the macro or cell pins and finds pins which have ports with the shapes defined on the specific layers defined by the rules and user data. Further processing is then performed based on a set of rules and the pin data to generate a CML file that contains relevant information regarding relevant pins.

21 Claims, 3 Drawing Sheets

METHOD AND SYSTEM FOR THE CONDENSED MACRO LIBRARY CREATION

CROSS-REFERENCE TO RELATED APPLICATIONS

The instant application constitutes a division of and thereby claims the benefit of U.S. application Ser. No. 11/098,026, now U.S. Pat. No. 7,665,044, filed on Apr. 1, 2005, and entitled "METHOD AND SYSTEM FOR THE CONDENSED MACRO LIBRARY CREATION", the content of which is hereby incorporated by reference in its entirety.

FIELD OF THE INVENTION

The field of the invention relates generally to circuit package design, and more particularly to systems and methods for identifying relevant input and output sources on a circuit.

BACKGROUND

In general I/O Library cells and the general design data representations of I/O cells, for example LEF (Library Exchange Format) files do not contain sufficient information for a designer to be able to determine how to interpret the function of the pins of individual I/O cells. The pins of I/O cells can supply power to the cell, pass power supply voltages from outside the IC into the core of the IC, be embedded flip-chip solder bumps or wirebond bondpads, connect multiple redistribution layers routing to separate flip-chip bumps or wirebond pads, or connect to core cells of the IC to pass signals from outside the chip to the IC or from the IC to the system to which it is connected.

There can be dozens or even hundreds of pins on one I/O cell, and each pin can be used for one of the above purposes. In order to correctly interpret I/O cells to use them appropriately when planning the I/O structures and die pads of a new IC, it is necessary to determine how each pin is intended to be used. Certain pins, such as those which supply power to the cell, or pins that connect to core cells are not important when planning I/O. Thus, they can usually be ignored. Other pins, such as those that are embedded die pads or that connect to die pads, are significant to I/O planning.

As this information is not available in the cell library, the current approach to determining how to interpret the various pins of I/O cells when planning the I/O and die pad layout of a new IC was done manually by a human. This made sense since the I/O planning was a completely manual task. Once the Condensed Macro Library file format was developed, a way was provided to record the information. However, this solution still requires the CML file to be created manually by a human using a computer program user interface. Thus, a user must manually determine the use of each pin for all cells in the library. Since a library typically has hundreds of cells that can have hundreds of pins this could be a very lengthy and tedious process.

What is needed is a system and method using parameterized rules which can develop a Condensed Macro Library file that contain the desired information.

SUMMARY

According to some embodiments, described is an intelligent method and a system to pre-scan IC cell library files, analyze cell and pin data therein, and based on special heuristic algorithms using rules with some user defined parameters, automatically deduce I/O cell and pin information is described. The method can read cell library data in Library Exchange Format (LEF) or any other formats, such as Open Access or any other known and/or convenient format.

An analysis is performed by the system and the rules along with any user modified parameters, and the resulting deduced information, are stored in a Condensed Macro Library (CML) file. The information deduced from the library and stored in the CML file is used to determine which cells and pins are important when importing I/Os from an IC design to IC packaging tools or other tools, and how to interpret the pins of those cells. The system and method can also provide automated selection of I/O cells and I/O pins plus redistribution layer (RDL) routing connection point pins of those cells for an entire cell library

BRIEF DESCRIPTION OF THE DRAWINGS

The drawings illustrate the design and utility of preferred embodiments of the present invention. It should be noted that the figures are not drawn to scale and that elements of similar structures or functions are represented by like reference numerals throughout the figures. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
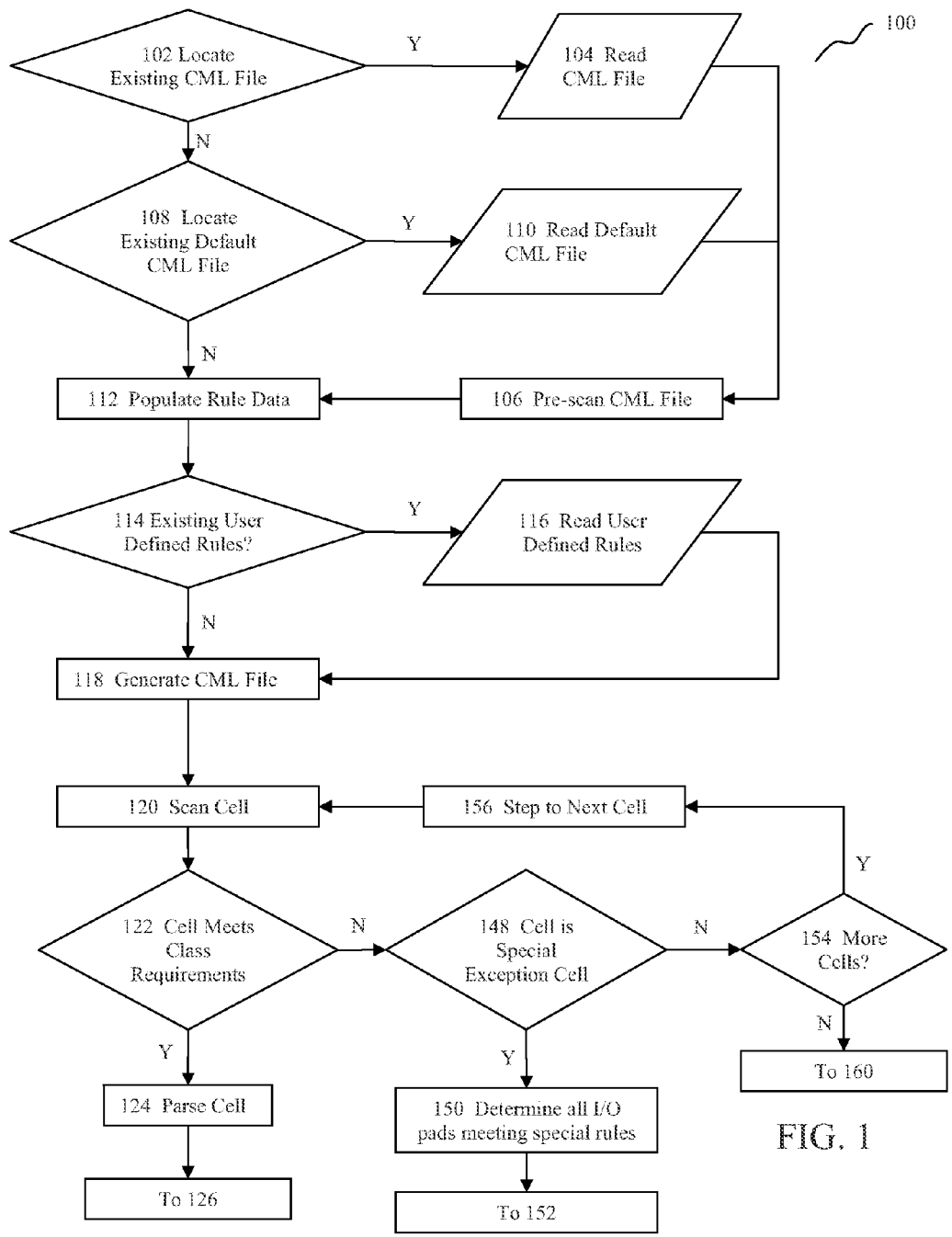
FIG. 1 depicts a method for generating a CML file containing pin information.
Figure 1:
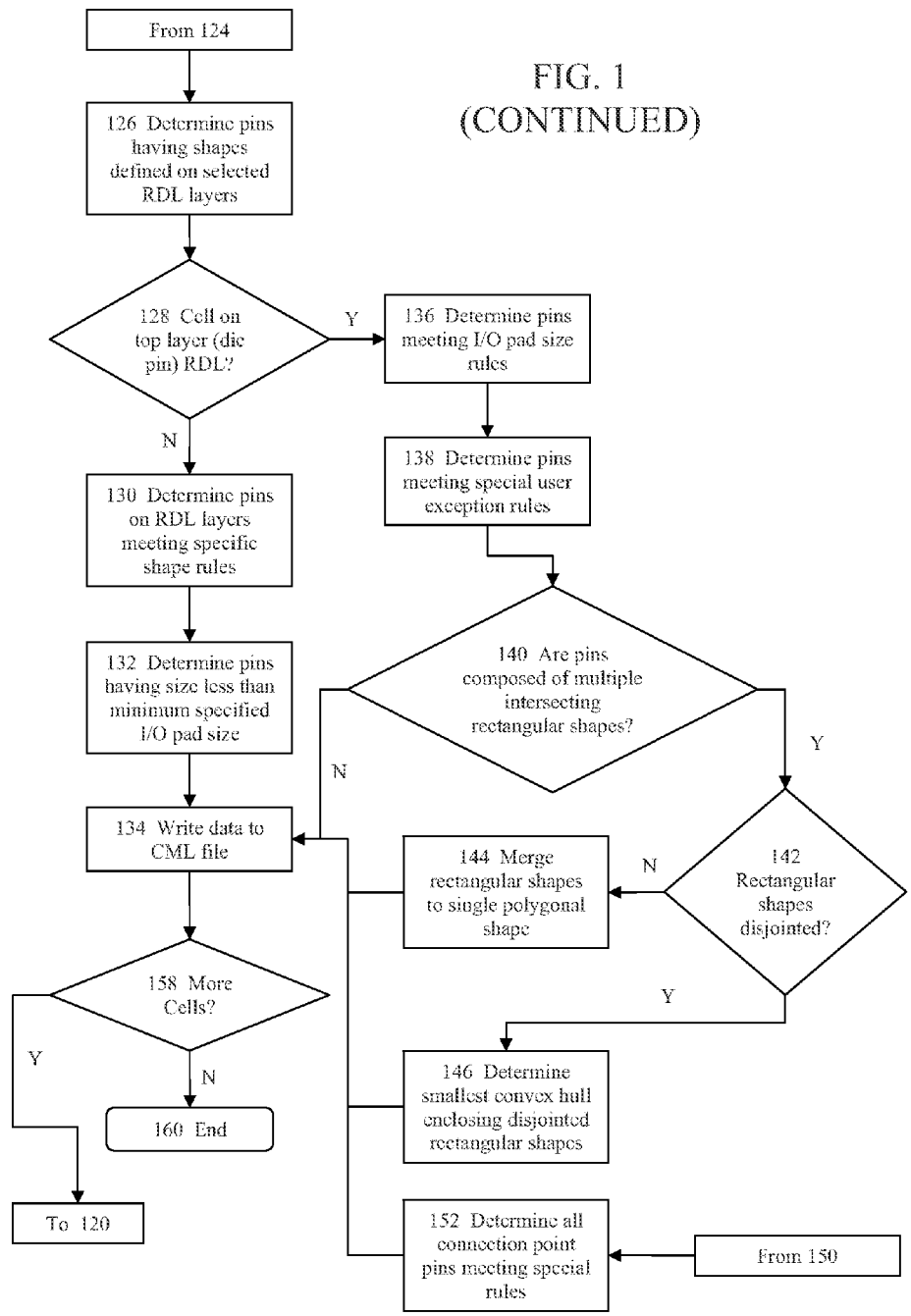

FIG. 1 represents a diagram showing the steps of a method for the creation for a condensed macro library (CML).

In LEF, cells are called macros, so "macro" and "cell" should be considered synonymous terms In step 102 the system determines whether it can locate an existing condensed macro library file. If the system locates an existing CML file it will advance to step 104 where the located CML file will be read. In step 106 the located CML file will be pre-scanned. Then, in step 112, the system will populate rule data based on the located CML file and a default set of rules. The default set of rules can be manually entered into the system or be read from a file. Whether manually entered or read from a file, in some embodiments, the default set of rules can be modified by a user. In alternate embodiments, the default rules can be fixed. In some embodiments the rules can identify any known and/or convenient feature of components associated with the circuit package design and/or input and output sources on a circuit.

If the result in step 102 is that no CML file is located, then the system can proceed to step 108 where the system will attempt to locate an existing default condensed macro library file. If the system is unable to locate an existing default CML file, then the system can proceed to step 112 and populate rule data based on a default set of rules, as previously described.

If the system is able to locate an existing default CML file in step 108, the default CML file can be read in step 110. In step 106, the default CML file can be pre-scanned and then the resulting data can be combined with default CML rules and populated into rule data in step 112.

The resulting populated rule data from step 112 will be funneled to step 114 and a determination can be made regarding whether existing user defined rules exist. If at step 114 the system determines that existing user defined rules exist, then the user defined rules will be read in step 116 and a CML file will be generated in step 118 based on the populated rules from step 112 and the existing user defined rules. If the system determines that no predefined rules exist then the CML file will be generated in step 118 based on the populated rules from step 112.

In alternate embodiments, steps 102-118 can be performed in any convenient sequence or can be eliminated and substituted with a set of predefined rules which can be user modifiable.

In step 120 a cell is scanned to retrieve relevant pin data and cell class data. In step 122, the data retrieved in step 120 is used to determine whether the cell meets predefined class criteria. The predefined class criteria can be manually entered or can be read from a file. Whether manually entered or read from a file, in some embodiments the predefined class criteria can be at least partially specified by a user. In alternate embodiments, the predefined class criteria can be fixed. In one embodiment, the predefined user criteria can include shape data, dimension data, composition data or any other known and/or convenient cell characteristic.

If the cell does meet the specified class criteria, the cell can be parsed in step 124 and the shape of the pins of the defined redistribution layer (RDL) can be determined in step 126. In step 128, a determination will be made if the cell is on the top layer or die layer.

If the determination is made that the cell is not on the top layer or die layer then the system can proceed to step 130. In step 130 a determination of the pins that are on the RDL is made to locate such pins meeting specific specified shape rules. The specific shape rules can be geometric specification, electrical specification or any known and/or convenient shape specification. The specific shape rules can be manually entered or read from a file. In some embodiments the specific shape rules can be modified by a user while in alternate embodiments the specific shape rules can be fixed.

In step 132 pins having size that is less than a minimum specified input/output pad size are identified. Once this identification is made a write operation can be performed to write data to the CML created in step 118. The minimum specified input/output pad sizes can be manually entered or read from a file. In some embodiments the minimum specified input/output pad sizes can be modified by a user while in alternate embodiments the minimum specified input/output pad sizes can be fixed.

Returning to step 128. If a determination is made that the cell is on the top or die pin layer, then the system can determine the number of pins meeting input/output pad size rules in step 136. In step 138, those pins meeting special user exception rules can be identified. Both input/output pad size rules and special user exception rules can be manually entered or read from a file. In one embodiment, both input/output pad size rules and special user exception rules can be modified by a user. In alternate embodiments, input/output pad size rules can be fixed.

In step 140, a determination can be made if any pins are comprised of multiple intersecting rectangular shapes. If the determination is made that none of the pins are comprised of multiple intersecting rectangular shapes the system can proceed to step 134 where data will be written to the CML file created in step 118. If in step 140, a determination is made that some pins are comprised of multiple intersecting rectangular shape then a second determination will be made in step 142 as to when the rectangular shapes are disjointed. If the rectangular shapes are determined not to be disjointed the system will proceed to step 144. In step 144 the rectangular shapes will be merged into a single polygonal shape and the data related to the single polygonal shape can then, in step 134, be written to the CML file generated in step 118. If in step 142 the rectangular shapes are determined to be disjointed then in step 146 the system can determine the smallest convex hull enclosing the disjointed rectangular shapes. The smallest convex hull enclosing the disjointed rectangular shapes can be determined using any known or convenient determination method. The data related to the smallest convex hull can be used to write to update the CML file, created in step 118, in step 134.

From step 134 the system can proceed to step 158. In step 158 the system determines whether more cells are present. If the system determines more cells are present, it can return to step 156 and proceed to the next cell. If the system determines that there are no more cells present, it can proceed to step 160 where the CML file will be closed.

Returning now to step 122. If the determination is made the cells do not meet specific class requirements then the cell may be a special exception cell. In step 148, a determination is made is to whether the cell is a special exception cell. The determination as to whether a cell is a special exception cell can be performed by comparing the cell information contained in an exception cell file or by manual identification of the cell as a special exception cell. In one embodiment, the exception cell file can be a user created or modifiable file or can be a fixed file. In some embodiments, special exception cells can be identified specifically, can be identified based on the contents of a cell or based on any other known and/or convenient factors If the cell is determined to be a special exception cell, then in step 150 the system can determine whether all input/output pads of the cell meet the special rules. If all input/output pads meet the special rules, then in step 152 the system can determine all the connection point pins meeting the special rules. Based on the information from steps 150 and 152, CML data can be written to CML file created in step 118.

Returning to step 148. If the cell is determined not to be a special exception cell then the system can proceed to step 154 where a determination is made as to whether there are more cells present. If there are more cells present then it will proceed to step 156. In step 156, the system can increment to the next cell identified for processing and the system can then proceed to step 120 and the entire process from steps 120-158 can be repeated, as appropriate. If there are no more cells present then the system can perform an end operation to close the CML file, step 160.

Figure 2:
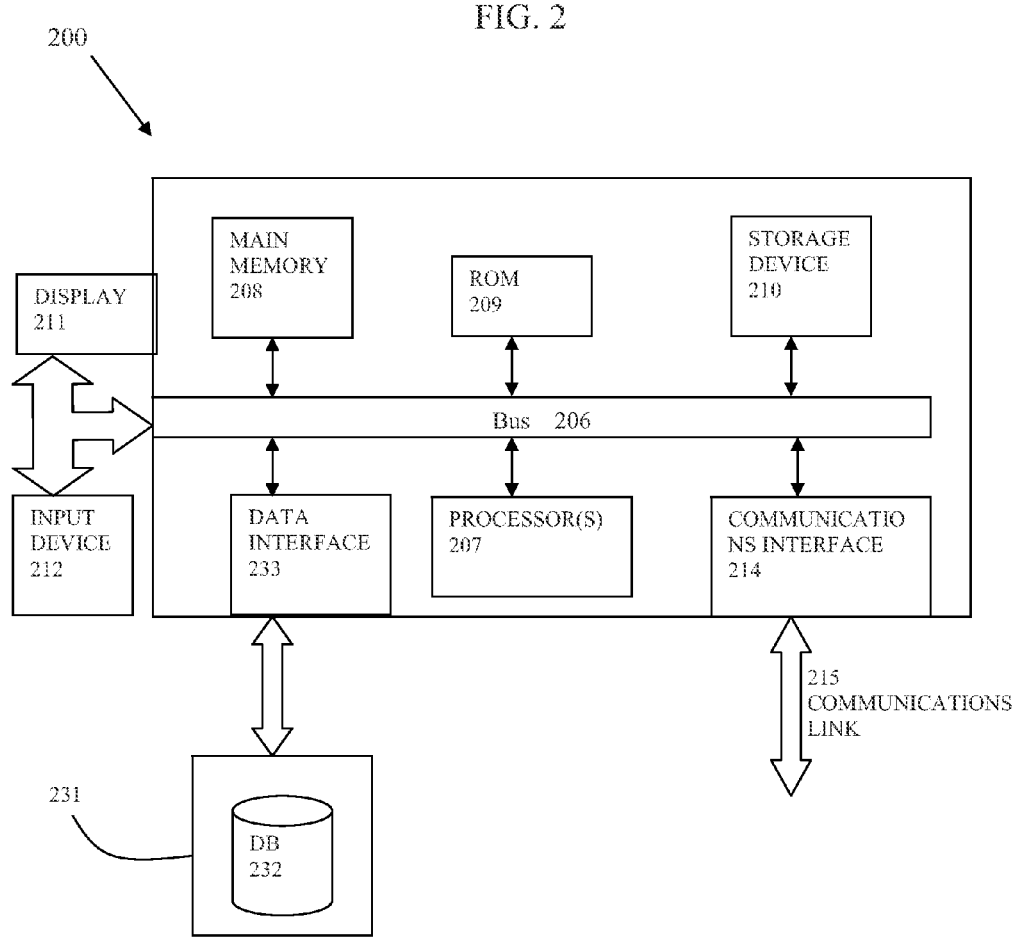
FIG. 2 depicts a computerized system on which a method for generating a CML file containing information can be implemented.

With reference to FIG. 2, the execution of the sequences of instructions required to practice the embodiments may be performed by a computer system 200 as shown in FIG. 2. In an embodiment, execution of the sequences of instructions is performed by a single computer system 200. According to other embodiments, two or more computer systems 200 coupled by a communication link 215 may perform the sequence of instructions in coordination with one another. Although a description of only one computer system 200 will be presented below, however, it should be understood that any number of computer systems 200 may be employed to practice the embodiments.

A computer system 200 according to an embodiment will now be described with reference to FIG. 2, which is a block diagram of the functional components of a computer system 200. As used herein, the term computer system 200 is broadly used to describe any computing device that can store and independently run one or more programs.

Each computer system 200 may include a communication interface 214 coupled to the bus 206. The communication interface 214 provides two-way communication between computer systems 200. The communication interface 214 of a respective computer system 200 transmits and receives electrical, electromagnetic or optical signals, that include data streams representing various types of signal information, e.g., instructions, messages and data. A communication link 215 links one computer system 200 with another computer system 200. For example, the communication link 215 may be a LAN, in which case the communication interface 214 may be a LAN card, or the communication link 215 may be a PSTN, in which case the communication interface 214 may be an integrated services digital network (ISDN) card or a modem, or the communication link 215 may be the Internet, in which case the communication interface 214 may be a dial-up, cable or wireless modem.

A computer system 200 may transmit and receive messages, data, and instructions, including program, i.e., application, code, through its respective communication link 215 and communication interface 214. Received program code may be executed by the respective processor(s) 207 as it is received, and/or stored in the storage device 210, or other associated non-volatile media, for later execution.

In an embodiment, the computer system 200 operates in conjunction with a data storage system 231, e.g., a data storage system 231 that contains a database 232 that is readily accessible by the computer system 200. The computer system 200 communicates with the data storage system 231 through a data interface 233. A data interface 233, which is coupled to the bus 206, transmits and receives electrical, electromagnetic or optical signals, that include data streams representing various types of signal information, e.g., instructions, messages and data. In embodiments, the functions of the data interface 233 may be performed by the communication interface 214.

Computer system 200 includes a bus 206 or other communication mechanism for communicating instructions, messages and data, collectively, information, and one or more processors 207 coupled with the bus 206 for processing information. Computer system 200 also includes a main memory 208, such as a random access memory (RAM) or other dynamic storage device, coupled to the bus 206 for storing dynamic data and instructions to be executed by the processor(s) 207. The main memory 208 also may be used for storing temporary data, i.e., variables, or other intermediate information during execution of instructions by the processor(s) 207.

The computer system 200 may further include a read only memory (ROM) 209 or other static storage device coupled to the bus 206 for storing static data and instructions for the processor(s) 207. A storage device 210, such as a magnetic disk or optical disk, may also be provided and coupled to the bus 206 for storing data and instructions for the processor(s) 207.

A computer system 200 may be coupled via the bus 206 to a display device 211, such as, but not limited to, a cathode ray tube (CRT), for displaying information to a user. An input device 212, e.g., alphanumeric and other keys, is coupled to the bus 206 for communicating information and command selections to the processor(s) 207.

According to one embodiment, an individual computer system 200 performs specific operations by their respective processor(s) 207 executing one or more sequences of one or more instructions contained in the main memory 208. Such instructions may be read into the main memory 208 from another computer-usable medium, such as the ROM 209 or the storage device 210. Execution of the sequences of instructions contained in the main memory 208 causes the processor(s) 207 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 207. Such a medium may take many forms, including, but not limited to and non-volatile media. Non-volatile media, i.e., media that can retain information in the absence of power, includes the ROM 209, CD ROM, magnetic tape, and magnetic discs. Volatile media, i.e., media that can not retain information in the absence of power, includes the main memory 208.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed:

1. A computer implemented method for identifying input and output sources on an integrated circuit, comprising:
   receiving information related to a cell in an electronic design for the integrated circuit;
   determining, by using at least one processor, pin properties associated with the cell, wherein the pin properties associated with the cell include importance information of at least one pin in the cell; and
   generating a file including the pin properties to be used to bridge the electronic design including the cell and an integrated circuit packaging design process.

2. The computer implemented method of claim 1, wherein the act of determining the pin properties includes analyzing the information to determine if a cell is within a predetermined class of cells.

3. The computer implemented method of claim 2, wherein the act of determining the pin properties includes analyzing a geometry of the pin to determine if the geometry meets predetermined geometric minimum dimensions.

4. The computer implemented method of claim 3, wherein the act of determining the pin properties includes analyzing the information to determine if the pin is located on at least one of an RDL (redistribution layer) and a die pin layer.

5. The computer implemented method of claim 4, wherein the act of determining the pin properties includes analyzing the information to determine if a pin geometry conforms with predetermined pad size limitations.

6. The computer implemented method of claim 5, wherein the act of determining the pin properties includes analyzing the information to determine if the cell comprises a special exception cell.

7. The computer implemented method of claim 1, further comprising:
   receiving an existing CML (Condensed Macro Library) file, wherein the act of generating the file comprises:

combining said existing CML file with the determined cell pin properties.

8. The computer implemented method of claim 1, further comprising:
receiving data; and
generating a CML file based, at least in part, on the received data.

9. The computer implemented method of claim 8 wherein the received data comprise, at least in part, rule data.

10. The computer implemented method of claim 9, wherein the received data is comprised, at least in part, of a default CML file.

11. The computer implemented method of claim 1, the process further comprising:
combining at least some of the pin properties with one or more rules to create resulting rule data, wherein the one or more rules comprise a default rule or a parameterized rule.

12. The computer implemented method of claim 11, the process further comprising:
determining whether or not a cell meets a class criterion based at least in part upon the resulting rule data.

13. The computer implemented method of claim 1, wherein the pin properties further include use information about how the at least one pin is intended to be used in the cell.

14. A computer program product comprising a non-transitory computer readable storage medium having a sequence of instruction stored thereupon which, when executed by at least one processor, cause the at least one processor to perform a processor for identifying input and output sources on an integrated circuit, the process comprising:
receiving information related to a cell in an electronic design for the integrated circuit;
determining, by using the at least one processor, pin properties associated with the cell, wherein the pin properties associated with the cell include importance information of at least one pin in the cell; and
generating a file including the pin properties to be used to bridge the electronic design including the cell and an integrated circuit packaging design process.

15. The computer program product of claim 14, the process further comprising:
receiving an existing CML file, wherein generating a file comprises:
combining said existing CML file with the determined cell pin properties.

16. The computer program product of claim 14, the process further comprising:
receiving data; and
generating a CML file based, at least in part, on the received data.

17. The computer program product of claim 14, wherein the act of determining the pin properties comprises at least one of:
analyzing the information to determine if a cell is within a predetermined class of cells;
analyzing a geometry of the pin to determine if the geometry meets predetermined geometric minimum dimensions;
analyzing the information to determine if the pin is located on at least one of an RDL and a die pin layer;
analyzing the information to determine if a pin geometry conforms with predetermined pad size limitations; or
analyzing the information to determine if the cell comprises a special exception cell.

18. A system for identifying input and output sources on an integrated circuit, comprising:
a computer system which comprises at least one processor that is to:
receive information related to a cell in an electronic design for the integrated circuit;
determine pin properties associated with the cell, wherein the pin properties associated with the cell include importance information of at least one pin in the cell; and
generate a file containing the pin properties to be used to bridge the electronic design including the cell and an integrated circuit packaging design process.

19. The system of claim 18, the computer system is further to:
receive an existing CML file, wherein generating a file comprises:
combine said existing CML file with the determined cell pin properties.

20. The system of claim 18, the computer system is further to:
receive data; and
generate a CML file based, at least in part, on the received data.

21. The system of claim 18, the computer system is further to:
analyze the information to determine if a cell is within a predetermined class of cells;
analyze a geometry of the pin to determine if the geometry meets predetermined geometric minimum dimensions;
analyze the information to determine if the pin is located on at least one of an RDL and a die pin layer;
analyze the information to determine if a pin geometry conforms with predetermined pad size limitations; or
analyze the information to determine if the cell comprises a special exception cell.

* * * * *